United States Patent [19]

Inuzuka et al.

[11] Patent Number: 5,307,088
[45] Date of Patent: Apr. 26, 1994

[54] METHOD AND APPARATUS OF ENCODING COLOR IMAGE INFORMATION

[75] Inventors: Tatsuki Inuzuka, Hitachi; Kiyohiko Tanno, Katsuta; Yasuyuki Kozima, Hitachi, all of Japan

[73] Assignee: Hitachi, Ltd., Tokyo, Japan

[21] Appl. No.: 78,777

[22] Filed: Jun. 21, 1993

Related U.S. Application Data

[63] Continuation of Ser. No. 598,757, Oct. 15, 1990, abandoned, which is a continuation-in-part of Ser. No. 243,143, Sep. 9, 1988, abandoned, Continuation of Ser. No. 713,858, Mar. 19, 1985, abandoned.

[30] Foreign Application Priority Data

Mar. 21, 1984 [JP] Japan .................................. 59-52169

[51] Int. Cl.⁵ ............................................. G09G 5/04
[52] U.S. Cl. ..................................... 345/153; 348/713
[58] Field of Search ................... 345/150, 153; 358/13, 358/17, 11, 21 R, 12, 31, 40, 78, 80, 81; H04N 9/00, 9/12, 9/30, 9/16, 9/44, 9/64, 11/00, 11/20

[56] References Cited

U.S. PATENT DOCUMENTS 4,303,912 12/1981 Stafford et al. ..................... 340/703
4,379,292 4/1983 Minato et al. ................... 340/703 X
4,584,597 4/1986 Guichard ............................. 358/13

Primary Examiner—Richard Hjerpe
Attorney, Agent, or Firm—Antonelli, Terry, Stout & Kraus

[57] ABSTRACT

Three chrominance signals representative of a color image are represented by a coordinate system in a uniform color space, and a probability of occurrence of colors on the color space and a correlation of the chrominance signals for pixels are referenced in encoding color image information signals.

4 Claims, 14 Drawing Sheets

COORDINATE
SYSTEM

FIG. 9A

ENCODING OF L*

| L* C* H* | L* C* H* | L* C* H* | L* C* H* | L* C* H* |
|---|---|---|---|---|
| L* C* H* | L* C* H* | | | |

ENCODING OF C*

| L* C* H* | L* C* H* | L* C* H* | L* C* H* | L* C* H* |
|---|---|---|---|---|
| L* C* H* | L* C* H* | L* | | |

ENCODING OF H*

| L* C* H* | L* C* H* | L* C* H* | L* C* H* | L* C* H* |
|---|---|---|---|---|
| L* C* H* | L* C* H* | L* C* | | |

| BIT | 15 |     | FLAG |
|-----|----|-----|------|
| BIT | 14 | R0  | $L^*_0$ |
| BIT | 13 | R1  | $L^*_1$ |
| BIT | 12 | R2  | $L^*_2$ |
| BIT | 11 | R3  | $L^*_3$ |
| BIT | 10 | R4  | $L^*_4$ |
| BIT | 9  | G0  | $C^*_0$ |
| BIT | 8  | G1  | $C^*_1$ |
| BIT | 7  | G2  | $C^*_2$ |
| BIT | 6  | G3  | $C^*_3$ |
| BIT | 5  | G4  | $C^*_4$ |
| BIT | 4  | B0  | $H^*_0$ |
| BIT | 3  | B1  | $H^*_1$ |
| BIT | 2  | B2  | $H^*_2$ |
| BIT | 1  | B3  | $H^*_3$ |
| BIT | 0  | B4  | $H^*_4$ |

METHOD AND APPARATUS OF ENCODING COLOR IMAGE INFORMATION

This application is a continuation of application Ser. No. 07/598,757 filed on Oct. 15, 1990, now abandoned, which is a continuation-in-part application of application Ser. No. 07/243,143 filed on Sep. 9, 1988, now abandoned, which is a continuation of application Ser. No. 06/713,858 filed on Mar. 20, 1985, now abandoned.

BACKGROUND OF THE INVENTION

The present invention relates to a method of encoding color image information and, more particularly, to a method of encoding color image information which is suitable for efficiently transmitting and storing color image information.

Red, green and blue (RGB) signals, cyan, magenta and yellow (CMY) signals or YIQ signals which are used in a standard television system (NTSC system) have been used as chrominance signals to represent a color image.

The RGB signals are based on a spectrographic characteristic of a visual sense of human beings. Any color which can be visually sensed can be matched by a combination of the three colors R, G and B.

The CMY signals are derived as complementary colors of the RGB signals and are three-primary color signals which are utilized in printing for reproducing a color image by a subtractive combination of colors.

The YIQ signals were designed to reduce a transmission band of the chrominance signals in a television and they are calculated in accordance with the following formula.

$$\begin{pmatrix} Y \\ I \\ Q \end{pmatrix} = \begin{pmatrix} 0.299 & 0.587 & 0.114 \\ 0.594 & -0.276 & -0.324 \\ 0.214 & -0.522 & 0.309 \end{pmatrix} \cdot \begin{pmatrix} R \\ G \\ B \end{pmatrix} \quad (1)$$

However, those chrominance signals were not designed to quantize the color image information with several-bit data width (code word length), and hence the changes in the chrominance signals do not uniformly correspond to changes in the colors visible to humans.

For example, in a color space having coordinate axes of three chrominance signals R, G and B shown in FIG. 1, the change of color caused by the change of the chrominance signal of the same magnitude may be a significant visible color change or may be a substantially invisible color change.

This is true for the CMY signals and the YIQ signals. In any case, the variations in the chrominance signals do not uniformly correspond to the variations in the visible colors.

As a result, when the chrominance signals are to be quantized by the several-bit code length, the changes in the colors caused by the changes of the chrominance signals corresponding to the quantization steps have large variations. Thus, the color reproducibility is lowered and the redundancy of the image information increases.

The RGB signals, CMY signals and YIQ signals do not have clear correspondence to hue, value and chroma (H, V and C) which are defined in the Munsell color notation system. Accordingly, even if only one of the three chrominance signals is changed, all of the H, V and C of the color may be affected.

As a result, when the chrominance signals are coarsely quantized by several-bit code words, each of the H, V and C of the color is affected if a rounding error as a result of signal processing or noise superposition is included.

One known encoding method of a multi-gradation image signal is a prediction encoding method which utilizes gradation correlation between adjacent pixel. An encoding method of a monochromatic multi-gradation image by the prediction encoding method will now be explained.

Referring to FIG. 2, it is assumed that a pixel $X_0$ under consideration which is to be encoded and encoded reference pixels $X_1$, $X_2$ and $X_3$ adjacent to the pixel $X_0$ under consideration have gradations $x_0$, $x_1$, $x_2$ and $x_3$, respectively. Since the pixel under consideration and the reference pixels are close to each other on an image screen, it is anticipated that the gradation correlation among the pixels is high.

Thus, a prediction gradation $\hat{x}_0$ which is a prediction (e.g., estimation) of the gradation $x_0$ of the pixel $X_0$ under consideration can be calculated by utilizing the gradation correlation of the pixels and using a linear formula (2).

$$\hat{x}_0 = \frac{1}{2}(x_1 + \frac{1}{2}(x_2 + x_3)) \quad (2)$$

A difference between the actual gradation $\hat{x}_0$ and the prediction gradation $x_0$ is defined as a prediction error e.

$$\hat{e} = \hat{x}_0 - x_0 \quad (3)$$

As described above, the gray-level image has the high gradation correlation between the adjacent pixels. Accordingly, it is anticipated that a probability of occurrence of the prediction error e shown by the formula (3) distributes with a peak at 0 as shown in FIG. 3.

Thus, by assigning a shorter code word to a pixel having a higher probability of prediction error e and a longer code word to a pixel having a lower probability of prediction error, the redundancy included in the image information can be suppressed and efficient encoding is attained.

In order to apply the prior art encoding method developed for the monochromatic image to a color image, the prior art encoding method developed for the monochromatic image is applied to each of the three chrominance signals. This technique is disclosed, for example, in an article "The Perceptual Color Space of Digital Image Display Terminals" by Antonio Santisteban, IBM J. RES. DEVELOP. Vol. 27, No. 2, March 1983.

SUMMARY OF THE INVENTION

It is an object of the present invention to provide a method of encoding color image information, which can encode the color image information having a higher reproducibility with a shorter code word.

In accordance with the present invention, three chrominance signals which represent a color image are represented by coordinates of uniform color space, and the color image information is encoded at a high encoding efficiency by referring the probability of occurrence of color on the color space and the correlation of the chrominance signals.

BRIEF DESCRIPTION OF THE DRAWINGS

FIGS. 9A to 9C show chrominance signal arrangements of reference chrominance signals which may be used to determine prediction chrominance signals.

FIGS. 12A and 12B illustrate data conversion.

DESCRIPTION OF THE PREFERRED EMBODIMENTS

In order to facilitate the understanding of features of the present invention, a method of representing the chrominance signals used in the present invention is first explained.

As described above, when the RGB signals, CMY signals or YIQ signals are used to represent a color image, a change in a visually sensed color and a change in the chrominance signals do not uniformly correspond and hence it is difficult to quantify the change of color.

In order to uniformly quantify the change of visually sensible color, a uniform color space has been proposed. The CIE (Commission Internationale de l'Eclairage) recommended two uniform color spaces CIE 1976 L*u*v* and CIE 1976 L*a*b* in 1976.

Those uniform color spaces are defined to quantitatively grasp the change of a visually sensed color. Any two colors which can be visually sensed as the same change can be represented as the same positional change on the uniform color space.

The following advantages are presented by representing the chrominance signals in the coordinate system on the uniform color space.

First, the change in the chrominance signal and the change in the visually sensed color uniformly correspond over the entire area of the color space and hence the color reproducibility is improved and the quantization of the chrominance signal with less redundancy is attained when the chrominance signal is coarsely quantized by several bits.

Figure 4:
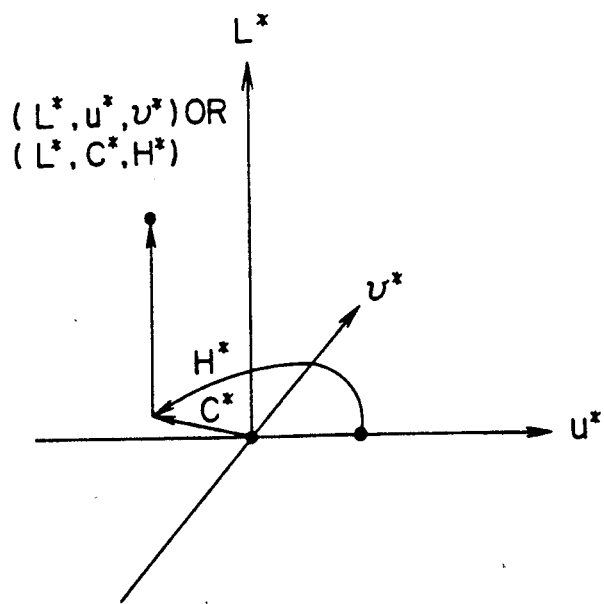
FIG. 4 is a color space chart for illustrating a manner of defining coordinates on a uniform color space CIE 1976 L*u*v*.

Further, by converting three chrominance signals L*, u* and v* in the uniform color space CIE 1976 L*u*v* to a cylindrical coordinate system as shown in FIG. 4 in accordance with the following formulas, three chrominance signals L*, C* and H* which correspond hue, value and chroma (H, V and C) result which are defined in the Munsell color notation system.

$$C^* = ((u^*)^2 + (v^*)^2)^{\frac{1}{2}} \\ H^* = \arctan(v^*/u^*) \quad (4)$$

By using the above three chrominance signals L*, C* and H*, the interference among the H, V and C of color can be eliminated so that a processing error and a noise which are added to one chrominance signal do not affect the H, V and C of color.

By using the above three chrominance signals, the H, V and C of color can be independently corrected so that correction means therefor can be readily attained.

Characteristics of the chrominance signals used in the present invention are now explained.

It is known that a possible range on the uniform color space of a color (object color) created by a light reflected on a surface of an object can be confined in a certain range because of the fact that the reflected light is not more intensive than an incident light.

Figure 5A:
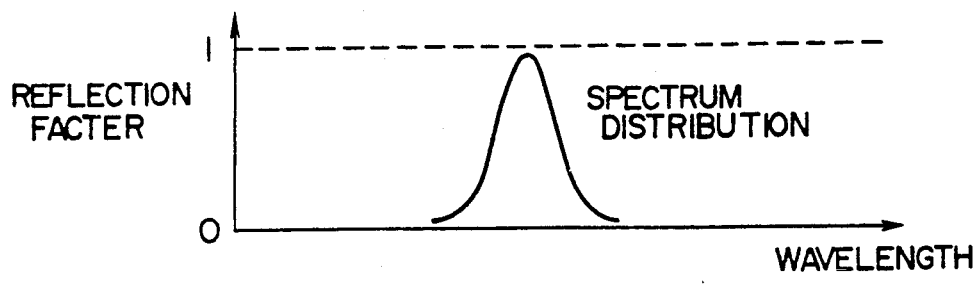
FIGS. 5A and 5B are spectrum charts for illustrating possible color ranges of object colors.
Figure 5B:
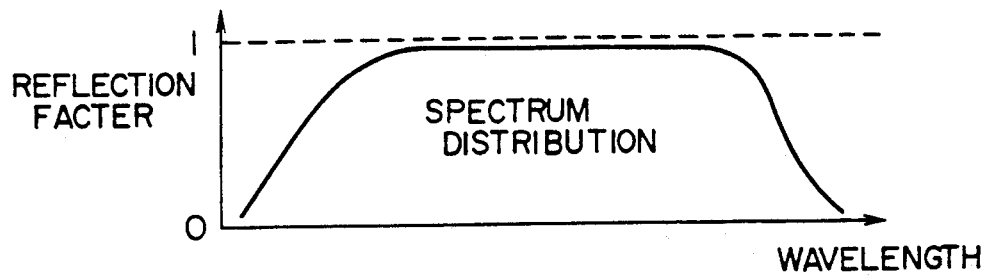

For example, as shown in FIG. 5A, a color having a narrow spectrum range, that is, a relatively pure color has a small integration over an entire spectrum range and hence it has a high chroma but a low value. On the other hand, as shown in FIG. 5B, a color having a wide spectrum range has a large integration and hence has a low chroma but a high value.

Figure 5C:
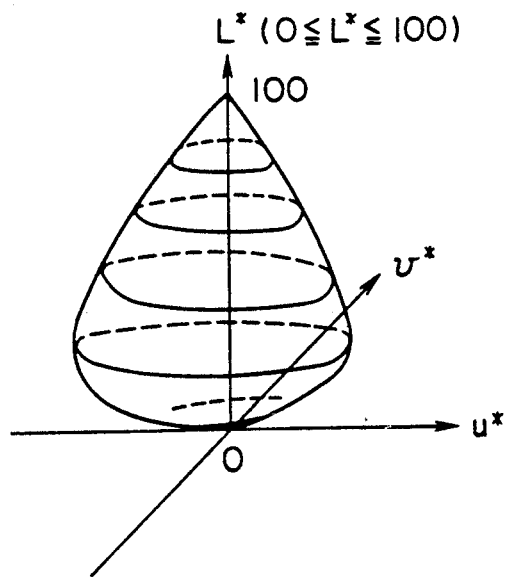
FIG. 5C is a color space chart showing a possible color cubic of the object color.

Because of an upper limit of a reflection factor of the object surface, the possible range of the object color in the uniform color space can be confined to an interior of a cubic (color cubic) as shown in FIG. 5C.

It can thus be said that a probability of occurrence of color is not uniform over the entire area on the color space.

Another reason for such non-uniformity of probability of occurrence of color than the principal cause due to the theoretical reason described above is as follows.

Because of a statistical nature of a color image, a probability of occurrence of a specific color may be high. In a color image produced by printing, the number of colors produced is substantially determined by the inks used for printing. The probability of occurrence of color has a variation due to the printed picture and pattern. This is not limited to the printed image, but similar statistical natures may be applied to a color photograph, a picture and a television color signal.

The probability of occurrence of color may be nonuniform due to a characteristic of a color image input/output device. This is due to a characteristic such as a spectrum characteristic of an optical filter which color-decomposes an incident light, a spectrum sensitivity of a photo-electric converter or a spectrum characteristic of an ink of a color image recorder.

Thus, the color is confined in the certain range on the color space, the probability of occurrence of color out of that range is zero, and the probability of occurrence of color in that range in not uniformly distributed. Accordingly, by using those properties of the chrominance signal, the color image information can be efficiently encoded.

A method of quantizing the chrominance signal by utilizing the properties of the chrominance signal will now be explained.

As described above, the possible range of the object color on the color space can be confined in the interior of the color cubic shown in FIG. 5C.

Figure 6:
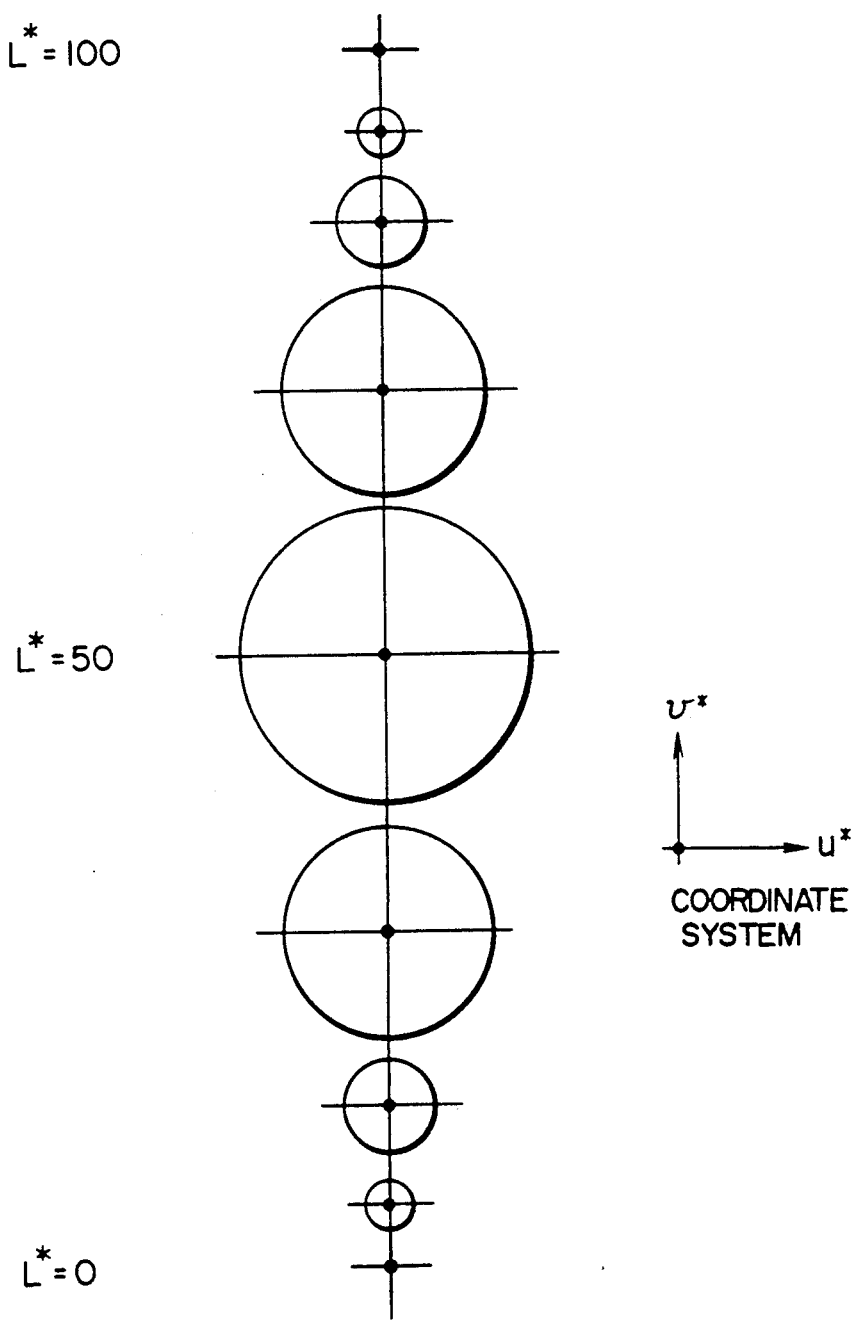
FIG. 6 is a developed view of the color cubic of FIG. 5C for illustrating possible ranges of chrominance signals u* and v*.

Considering the properties of the chrominance signals in the uniform color space CIE 1976 L*u*v*, the possible ranges of the chrominance signals u* and v* can be defined in accordance with the magnitude of the chrominance signal L* as shown in FIG. 6.

Figure 7:
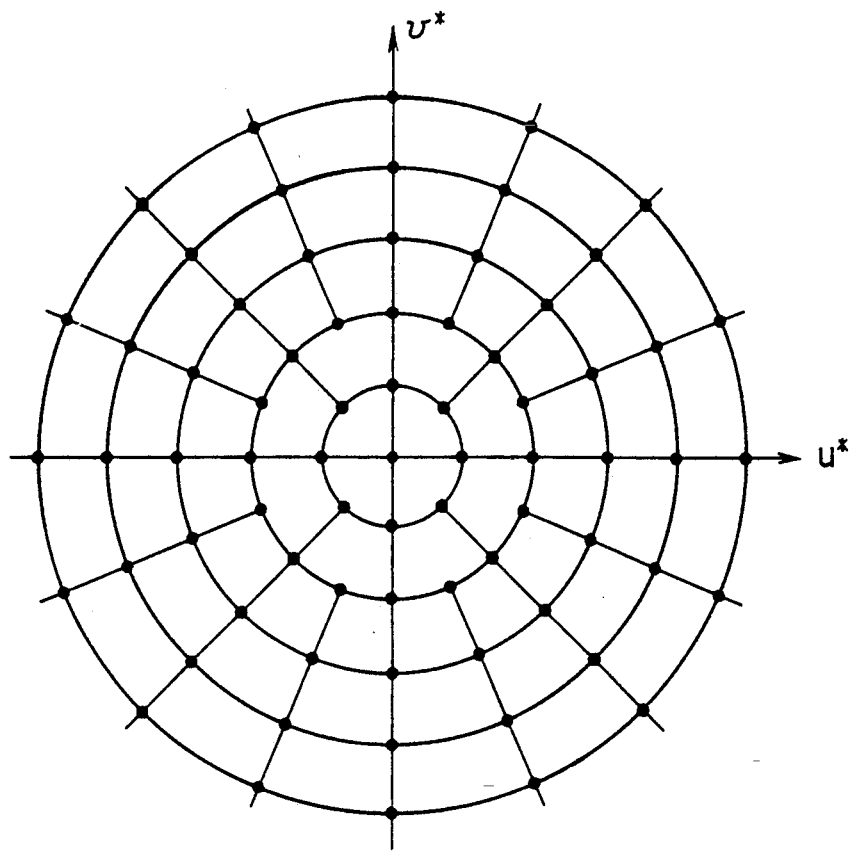
FIG. 7 illustrates a method of quantizing chrominance signals in a cylindrical coordinate system on the uniform color space CIE 1976 L*u*v*.
Figure 7:
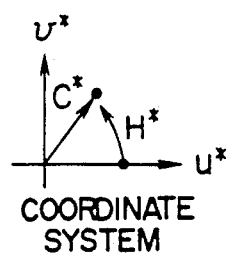

When the color space is represented by a cylindrical coordinate system and the chrominance signals L*, C* and H* determined in accordance with the formulas (4) are utilized, a possible range of the signal C* in a radial direction of the cylinder can be defined in accordance with the magnitude of the chrominance signal L*. Since a circumferential length of a circle having a radius of C* greatly varies, a quantization step for H* is changed in accordance with C* as shown in FIG. 7 so that spacings of sampling points on the color space are substantially uniform.

In the present embodiment, the possible ranges of the chrominance signals are defined and the quantization method of the chrominance signals is adaptively changed to unify the spacings of the coordinate points on the uniform color space.

When the chrominance signals L*, C* and H* are used, the possible range of the chrominance signal C* is defined in accordance with the magnitude of the chrominance signal L*, the chrominance signal C* in that range is quantized, the quantization step of the chrominance signal H* is changed in accordance with the magnitude of C* and the chrominance signals L*, C* and H* are quantized.

In this manner, the change in the chrominance signal and the change in the visually sensible color substantially uniformly correspond in the color cubic on the predetermined color space so that the color reproducibility is improved and the redundancy of the chrominance signals is suppressed when the chrominance signals are coarsely quantized by a several-bit code word length.

In the present embodiment, the uniform color space CIE 1976 L*u*v* is represented by the cylindrical coordinate system and the chrominance signals L*, C* and H* are used. Alternatively, the uniform color space CIE 1976 L* a* b* may be used or an orthogonal coordinate system or a polar coordinate system may be used.

The possible range of the chrominance signal on the uniform color space may be changed in accordance with the characteristic of the input/output device for the color image information, or in accordance with the statistical natures of the input color image information.

The quantization steps for the chrominance signals L* and C* may not be fixed but adaptively varied in accordance with the magnitudes thereof.

In order to implement the adaptive quantization method described above, the relation between the input chrominance signals and the output chrominance signals is composed in a table and the table is stored in a memory. Thus, by looking up the table, the output chrominance signal is determined.

Figure 8:
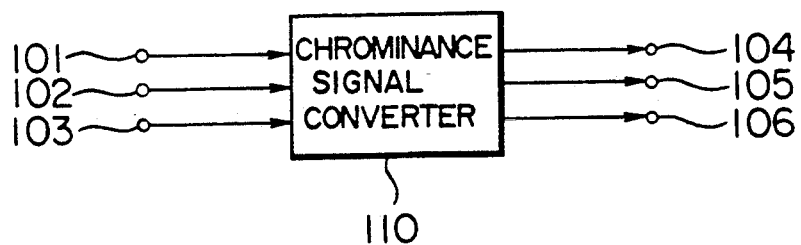
FIG. 8 shows a chrominance signal converter for converting an input chrominance signal to a chrominance signal represented in a coordinate system on the uniform color space CIE 1976 L*u*v*.

To this end, a chrominance signal converter 110 shown in FIG. 8 is used, and the table is looked up by the chrominance signals R, G and B applied to input terminals 101, 102 and 103 to produce the converted and adaptively quantized output chrominance signals L*, C* and H* at output terminals 104, 105 and 106.

In order to reduce a size of the table, an interpolation method may be used for a small change of the chrominance signal.

An algorithm for carrying out the conversion or the quantization of the chrominance signal can be implemented by a computer software or a logic circuit.

In the method of encoding the color image information in the present embodiment, encoding efficiency is attained by utilizing the above quantization method of the chrominance signals, the non-uniformity of the probability of occurrence of the chrominance signal and the correlation of the chrominance signals among the pixels of the image.

The present encoding method will now be explained in detail.

In order to predict i.e. determine, a chrominance signal of a pixel under consideration by utilizing the correlation of the chrominance signals among the pixels of the image, a chrominance signal for a pixel which is adjacent to the, pixel under consideration and an encoded and transmitted, chrominance signal for the pixel under consideration are utilized as the reference chrominance signals.

As shown in FIGS. 9A to 9C, when the chrominance signals L*, C* and H* are used and the chrominance signals for each pixel are encoded and transmitted in the order of L*, C* and H*, the previously encoded and transmitted chrominance signal may be used as the reference chrominance signal to predict the chrominance signal to be next encoded and transmitted.

This is applicable not only to a case where three chrominance signals are encoded and transmitted for each pixel but also to a case where the chrominance signals are encoded and transmitted for each scan line or frame.

In order to predict the chrominance signal to be next encoded and transmitted by using the reference chrominance signals, the following linear formulas may be utilized.

$$\hat{L}^*_{x_0} = \frac{1}{2}\left(L^*_{x_1} + \frac{1}{2}(L^*_{x_2} + L^*_{x_3})\right) \\ \hat{C}^*_{x_0} = \frac{1}{2}\left(C^*_{x_1} + \frac{1}{2}(C^*_{x_2} + C^*_{x_3})\right) \\ \hat{H}^*_{x_0} = \frac{1}{2}\left(H^*_{x_1} + \frac{1}{2}(H^*_{x_2} + H^*_{x_3})\right)$$

(5)

Prediction errors e which are differences between the actual chrominance signals $L^*_{x_0}$, $C^*_{x_0}$ and $H^*_{x_0}$ and the prediction (e.g., estimation) chrominance signals $\hat{L}^*_{x_0}$, $\hat{C}^*_{x_0}$ and $\hat{H}^*_{x_0}$ are calculated as follows.

$$e_{L^*} = \hat{L}^*_{x_0} - L^*_{x_0} \\ e_{C^*} = \hat{C}^*_{x_0} - C^*_{x_0} \\ e_{H^*} = \hat{H}^*_{x_0} - H^*_{x_0}$$

(6)

Since the probability of occurrence of the chrominance signal is distributed non-uniformly on the color space, it is seen that a probability of occurrence of the prediction error in accordance with the formula (6) is also distributed non-uniformly.

Figure 3:
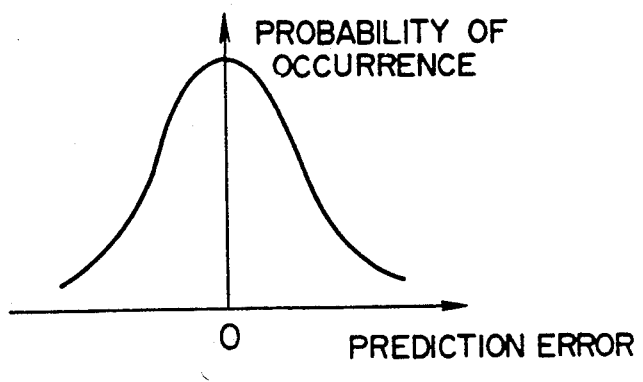
FIG. 3 shows a distribution of probability of occurrence of a difference (prediction error) between a prediction (e.g., estimation) signal and an actual signal.

For example, assuming that it is known that the range of the chrominance signal L* is between 0 and 100 and the prediction chrominance signal $\tilde{L}$* is 100, it is predicted that $e_L$* $\geq$ 0 because 0 $\leq$ L* $\leq$ 100. If the prediction (e.g., estimation) chrominance signal $\tilde{L}$* is 100, it is known that the distribution is different from the distribution of probability of occurrence of the prediction error shown in FIG. 3.

Thus, by utilizing the fact that the probability of occurrence of the chrominance signal is distributed non-uniformly on the color space, the probability of occurrence of the prediction i.e. determined error can be predicted by the prediction (e.g., estimation) chrominance signal. In other words, the distribution of occurrence of the prediction error can be predicted depending on the position on the color space occupied by the prediction chrominance signal.

The distribution of the probability of occurrence of the prediction error is affected by the possible range of the object color on the color space, the statistical natures of the color image, the image input/output characteristics and the quantization method of the chrominance signal, but most of them are previously known. Thus, by preparing tables of the prediction (e.g., estimation) chrominance signals and the distribution of the order of occurrence of the prediction errors, it may be used to predict the order of occurrence of the prediction errors.

Code words shown in Table 1 are assigned in a descending order of the order of occurrence of the prediction errors so that efficient encoding is attained.

TABLE 1

| Order | Code Word |
| --- | --- |
| 1 | 1 |
| 2 | 01 |
| 3 | 001 |
| . | . |
| . | . |
| . | . |
| n | 0..............01 |
|   | $\underbrace{\qquad}_{(n-1)}$ |

Figure 10:
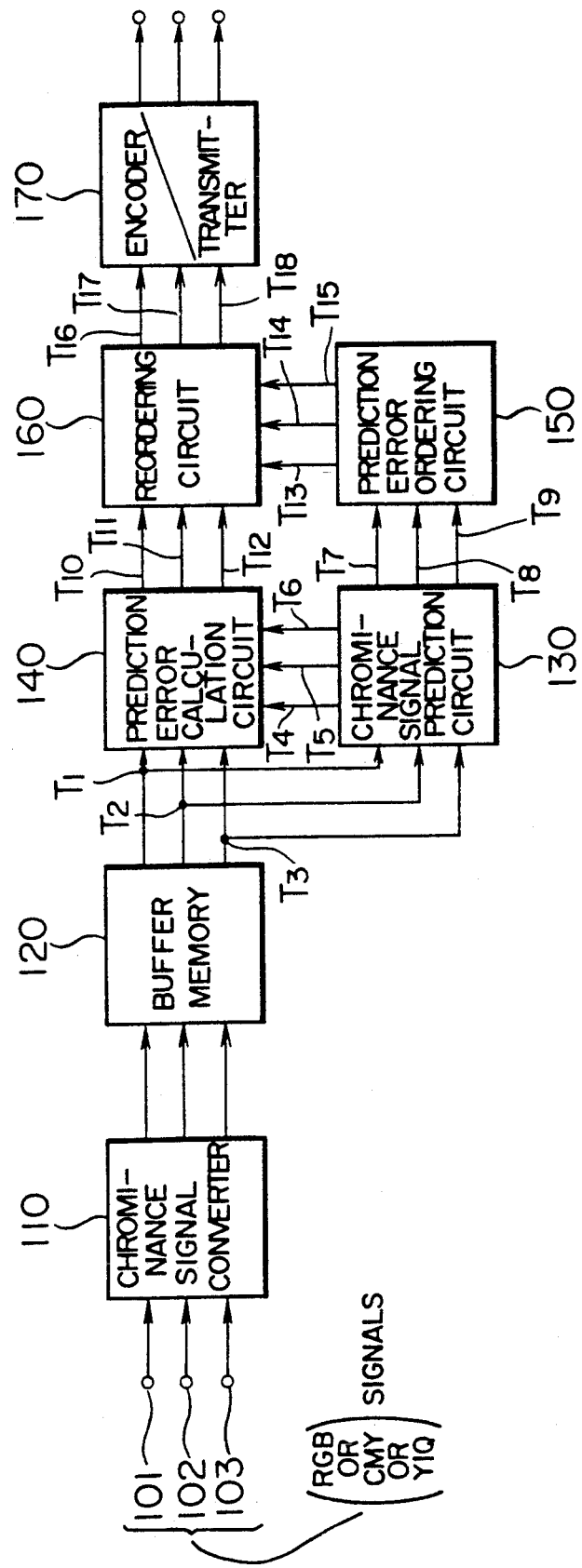
FIG. 10 is a block diagram of an encoder for encoding color image information.

FIG. 10 shows one embodiment of the encoder for encoding the color image. Numerals 101, 102 and 103 denote input terminals of chrominance signals. For example, RGB signals, CMY signals or YIQ signals are applied thereto. Numeral 110 denotes a chrominance signal converter which converts the input chrominance signals to chrominance signals on a uniform color space. It may be a ROM (read-only memory) which stores therein a table of input and output signals.

Numeral 120 denotes a buffer memory for storing therein the converted chrominance signals. A chrominance signal to be next encoded and transmitted is predicted by a chrominance signal prediction (e.g., estimation) circuit 130 by utilizing the chrominance signals stored in the buffer memory 120. The chrominance signal prediction circuit 130 may be realized by a processor which predicts the chrominance signal by putting the reference chrominance signals into the linear formulas, or by a memory which stores therein a table of the reference chrominance signals and the prediction chrominance signals.

Figure 1:
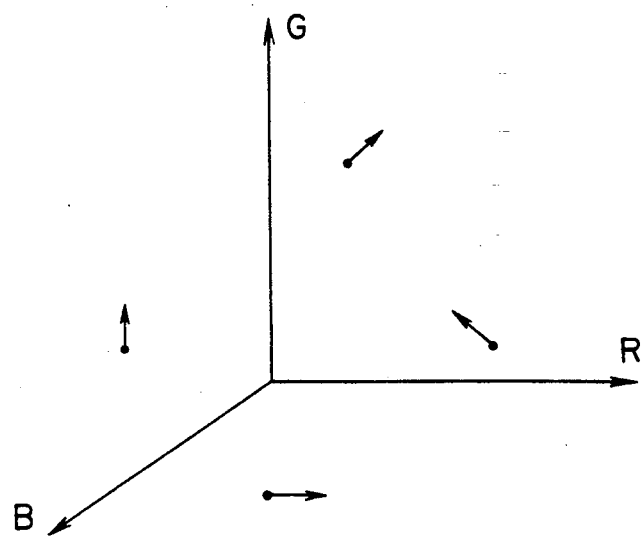
FIG. 1 illustrates a change in chrominance signals on a color space determined by RGB signals.
Figure 2:
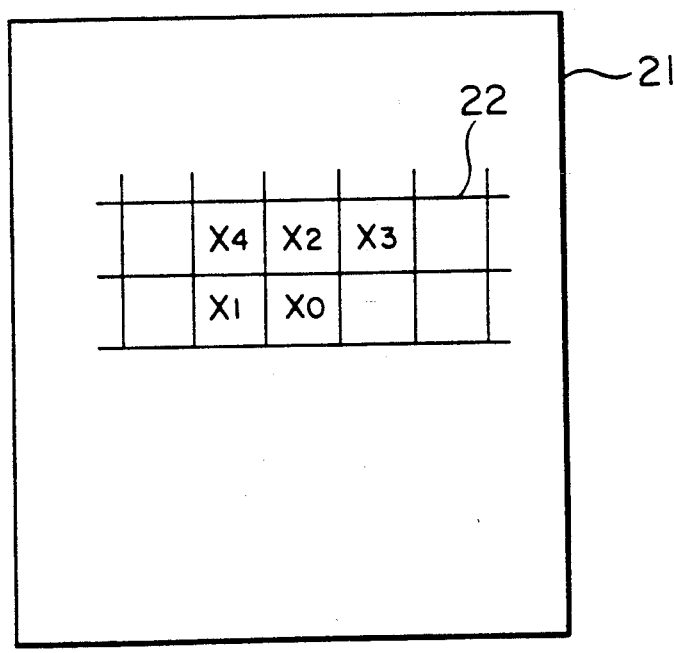
FIG. 2 shows arrangement of pixels which compose an image.

One will note from the equation (2) above that the prediction with respect to a particular pixel under consideration, such as, X0 in FIG. 2 is dependent on the overall linear average of the adjacent gradation of the pixel X1 preceding that of X0 along the same scanning line as affected by the average of the adjacent pixel gradations regarding the pixels X2 and X3 with respect to a preceding scanned line. More practically speaking, however, a prediction of the three chrominance signals L*, C*, H* respectively applied on the uniform color space can thus be likewise predicted using the linear formula relationships as that given by equation (5) above (noting that a separate calculation is effected for each one of the three chrominance signals) and, based upon these prediction (e.g., estimation) signals, three chrominance signal prediction errors pertaining to each pixel under consideration can be obtained using the relationships with respect to the above discussed equation (6).

Figure 10A:
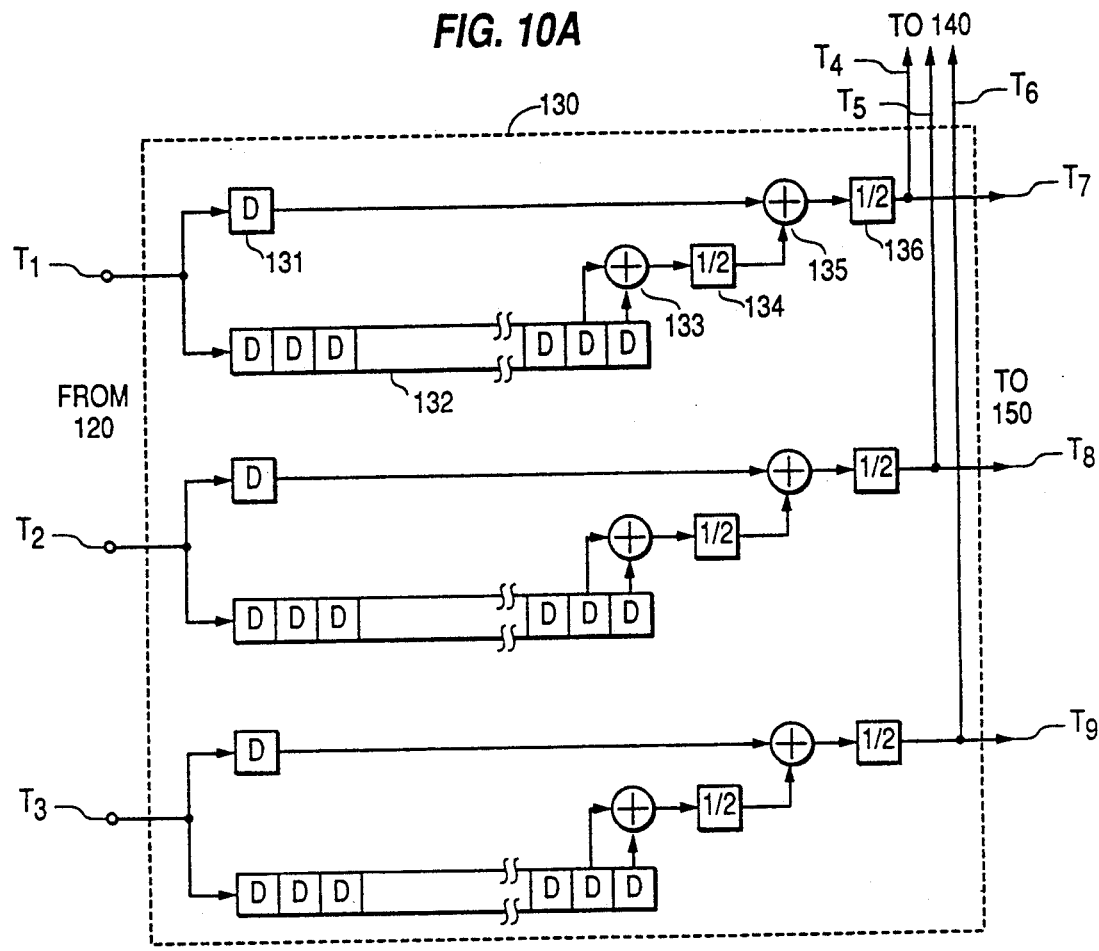
FIGS. 10A to 10D are schematic representations of blocks 130 to 160 in FIG. 10, respectively.

Concerning implementation of the chrominance signal prediction circuit, for example, three separately arranged calculating circuits are exemplified in connection with FIG. 10A of the drawings, pertaining to block 130 in FIG. 10, wherein the input/output connections (terminals) T1-T7, T2-T8 and T3-T9 are respectively associated with the calculation of the prediction signals with respect to each of the three chrominance signals associated with a pixel under consideration. That is, the details of the calculating circuits in block 130 include calculating circuits for each of the three chrominance signals for implementing the above equation (5). According to FIG. 10A, element 131 which is characterized by a delay circuit corresponds to a one pixel delay whereas the series or cascade delay circuit arrangement 132 corresponds to a delay circuit for an entire scanning line, such as an immediately preceding scanned line. That is, the one line delay circuit 132 effects a delay corresponding to the scanning of a single line preceding that of the pixel which is under consideration and, furthermore, it is noted that in the scanning line above (preceding scanning line) the scanning line of the pixel under consideration, the two adjacent pixels are averaged (see the last two (2) delay circuits in 132, summing circuit 133 and the divider by two 134). Furthermore, FIG. 10A includes with respect to each chrominance signal prediction circuit a summing circuit 135 and a further divider by two 136 which is consistent with the linear averaging relationship of equation (5) regarding the prediction of each of the three converted chrominance signals on a uniform color space. Outputs T7, T8 and T9 provide the respective values of the three prediction converted chrominance signals on a uniform color space, such as the L*, C*, H* value, respectively. In accordance with the particularities of the individual prediction circuits of the chrominance signals on a uniform color space, one will note that one pixel delay circuit, such as 131, and one line delay circuit such as 132, may be utilized for effecting a reference chrominance signal of a pixel adjacent to a pixel which is under consideration.

A difference between the prediction chrominance signal produced by the chrominance signal prediction circuit 130 and the actual chrominance signal produced by the buffer memory 120 is calculated by a prediction error calculation circuit 140.

Figure 10B:
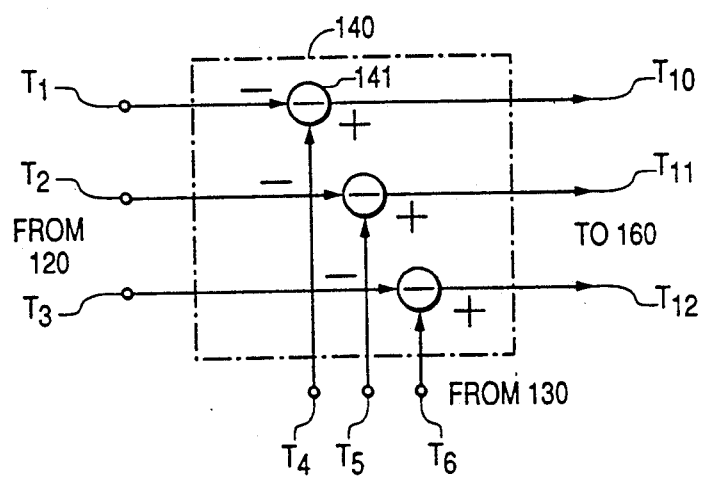

FIG. 10B of the drawings exemplifies an arrangement of three subtracting circuits (differencing circuits) pertaining to block 140 in FIG. 10, each one corresponding to a respective one of the chrominance signals $L^*$, $C^*$, $H^*$ in accordance with the prediction error equalities with respect to the above equation (6) for effecting or calculating the difference between the respective prediction chrominance signals outputted at T4 (T7), T5 (T8) and T6 (T9), with respect to each pixel under consideration, and the converted chrominance signals on a uniform color space with respect to those which are temporarily stored by buffer 120, provided at T1, T2 and T3, respectively, and which are to be encoded so as to produce a prediction error signal at corresponding outputs T10, T11 and T12 thereof. As illustrated in FIG. 10, taken with FIG. 10B, the prediction error signals, provided at T10, T11 and T12, relating to the respective chrominance signals of the pixel under consideration are respectfully applied as inputs to the reordering circuit 160 for effecting a reordering thereof in accordance with a determination effected by the prediction error ordering circuit An order based on the probability of occurrence of the prediction error is determined by a prediction error ordering circuit 150 by using the prediction chrominance signals produced by the chrominance signal prediction circuit 130. It may be implemented by a memory which stores therein a table of the prediction chrominance signals and the prediction error orders.

Figure 10C:
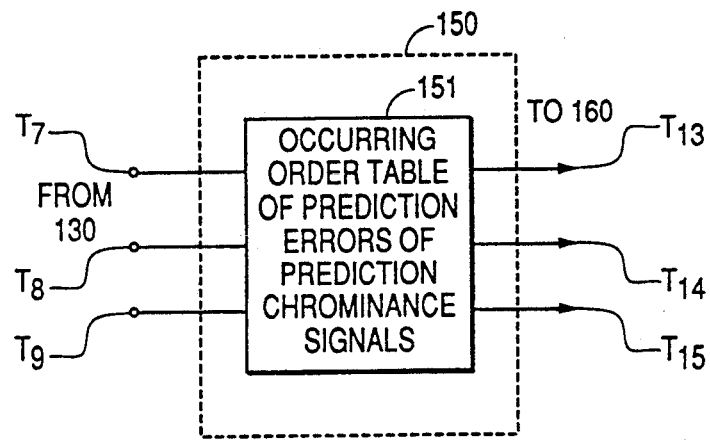

Since the order of occurrence or sequence of events of the prediction errors with respect to each prediction chrominance signal can be predicted beforehand statistically, the prediction error occurring orders for the respective prediction chrominance signals to be transmitted can be obtained by looking up the preformed memory table of stored information of occurring orders of several prediction errors for each prediction chrominance signal. Such a table look-up system is exemplified with respect to block 151 in FIG. 10C of the drawings. An order which is based on the probability of occurrence of the prediction error is determined by this prediction error ordering circuit 150 by using the prediction of the three chrominance signals pertaining to the pixel under consideration outputted by the circuit 130. Table memory 151 includes stored information of each of the prediction errors and corresponding order values thereof with respect to each chrominance signal and which values are based on the occurrence probability of the prediction error regarding each of the predicted chrominance signals. That is, such a table is effected by simply calculating the occurrence probability of each prediction error in accordance with the result obtained from an actual signal processing (a comparison between the prediction of each of the three chrominance signals and the prediction results of the actually produced chrominance signals) with respect to several images generally used. As, for example, a prediction error which has a relatively high occurrence probability is placed at a relatively higher position in the order.

Accordingly, in response to an input thereof which corresponds to the prediction signals associated with the three chrominance signals, the table 151 in the prediction error ordering circuit results in effecting a memory table with an order arrangement of the prediction chrominance signals which is based on the probability of occurrence of the prediction error.

A reordering circuit 160 reorders the prediction errors produced by the prediction error calculation circuit 140 in the order determined by the prediction error ordering circuit 150.

Figure 10D:
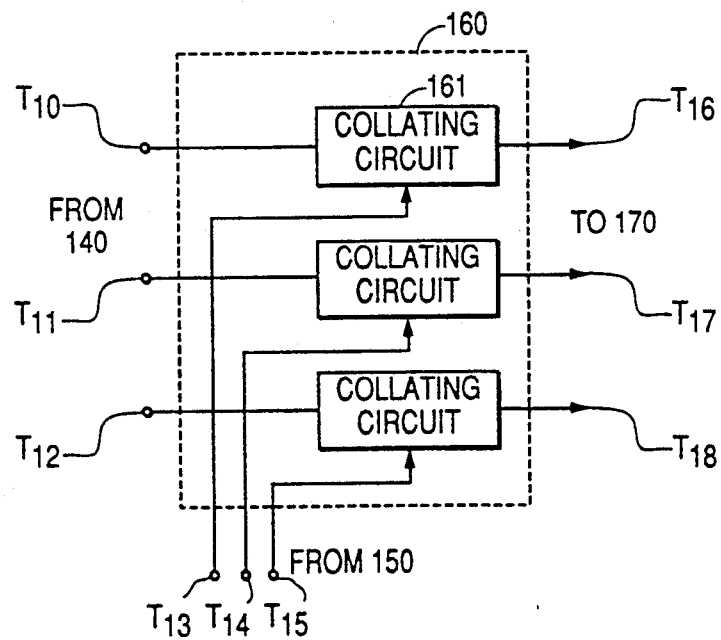

This reordering circuit 160 in FIG. 10 which is more specifically exemplified in FIG. 10D of the drawings, reorders or rearranges the prediction errors with respect to each of the predicted three chrominance signals and which errors are produced by the prediction error calculation circuit 140 in the order as determined by the prediction error ordering circuit 150. Such a reordering circuit 160 includes a collating circuit 161 for converting the prediction error associated with each one of the three converted chrominance signals transmitted from the prediction error calculation circuit 140 into corresponding ordered values in conjunction with the reference order set in the Table 151 of the prediction error ordering circuit 150. The respective legends attributed to the input and output connections (terminals) regarding each of the illustrations in FIGS. 10A, 10B, 10C and 10D are so as to effect a connecting interrelationship with respect to the overall inputting embodiment illustrated in FIG. 10 of the drawings.

The order for the chrominance signal which is to be next encoded and transmitted in encoded and transmitted by an encoder/transmitter 170. To this end, a memory which stores therein a table of the orders and the code words shown in Table 1 is used.

In the present embodiment, the chrominance signals are encoded by calculating the prediction chrominance signals by putting the reference chrominance signals into the linear formulas. Instead of using the linear formulas, the correlation between the reference chrominance signals and the prediction chrominance signals may be arranged in a table format and the table is looked up by the reference chrominance signal to determine the chrominance signal of a high probability of occurrence.

In this method, the correlation between the chrominance signals $L^*_{X0}$, $C^*_{X0}$ and $H^*_{X0}$ for the pixel $X_0$ under consideration and the chrominance signals $L^*_{X1} \ldots L^*_{Xn}$, $C^*_{Xn}$ and $H^*_{X1} \ldots H^*_{Xn}$ of the adjacent reference pixels $X_1 \ldots X_n$ are previously statistically determined and it is tabulated as shown in Table 2 so that the chrominance signals for the pixel under consideration are predicted based on the reference chrominance signals. When the chrominance signals for the pixel under consideration are referenced, the types of the chrominance signals which can be referenced are restricted depending on the order of transmission of the chrominance signals.

TABLE 2

| Reference Pixel | Reference Chrominance Signal | Order of Occurence | Prediction Chrominance Signal |
|---|---|---|---|
| $X_0$ | $L^*_{X0}$ $C^*_{X0}$ $H^*_{X0}$ | 1 | $^*_{X01}$ $^*_{X01}$ $^*_{X01}$ |
| $X_1$ | $L^*_{X1}$ $C^*_{X1}$ $H^*_{X1}$ | 2 | $^*_{X02}$ $^*_{X02}$ $^*_{X02}$ |
| $X_2$ | $L^*_{X2}$ $C^*_{X2}$ $H^*_{X2}$ | 3 | $^*_{X03}$ $^*_{X03}$ $^*_{X03}$ |
| $X_3$ | $L^*_{X3}$ $C^*_{X3}$ $H^*_{X3}$ | . | . |
| $X_4$ | $L^*_{X4}$ $C^*_{X4}$ $H^*_{X4}$ | . | . |

In encoding the prediction chrominance signals, short code words are assigned to the prediction chrominance signals in the descending order of the probabilities of occurrence and the actual chrominance signal is converted to the corresponding code word. When the code words are long, the prediction errors may be encoded.

When the prediction method by the table look-up and the prediction method by the linear formulas are combined and the table is looked up by the reference chrominance signals and the resulting code word length is longer than a predetermined length, the prediction chrominance signals may be encoded by linear formulas and several modes are selectively used depending on the distribution of the reference chrominance signals so that the size of table necessary for table look-up is reduced.

When the non-uniformity of the probability of occurrence of the chrominance signals of the color image is previously known and the image is monochromatic or includes a small number of colors, the chrominance signal converter 110, the chrominance signal prediction circuit 130 and the prediction error ordering circuit 150 in the embodiment of FIG. 10 may be changed by an operator to units adapted to the natures of the input chrominance signals so that efficient encoding is effected.

By providing means for sequentially measuring the statistical natures of the input chrominance signals, the units 110, 130 and 150 are sequentially modified or altered so that efficient encoding is attained.

In the present embodiment, the chrominance signals are encoded for each pixel of the color image. Because it is difficult to visually recognize the change of color for each pixel, a plurality of pixels may be grouped as a block, the block may be approximately represented by a small number of colors, and the approximated colors may be encoded in accordance with the present invention.

In the present embodiment, the chrominance signals to be encoded are represented by the coordinate system on the uniform color space recommended by CIE. If a color space designed to present uniform correspondence to the visual characteristic is available, it may be used in place of the CIE recommended color space.

Figure 11:
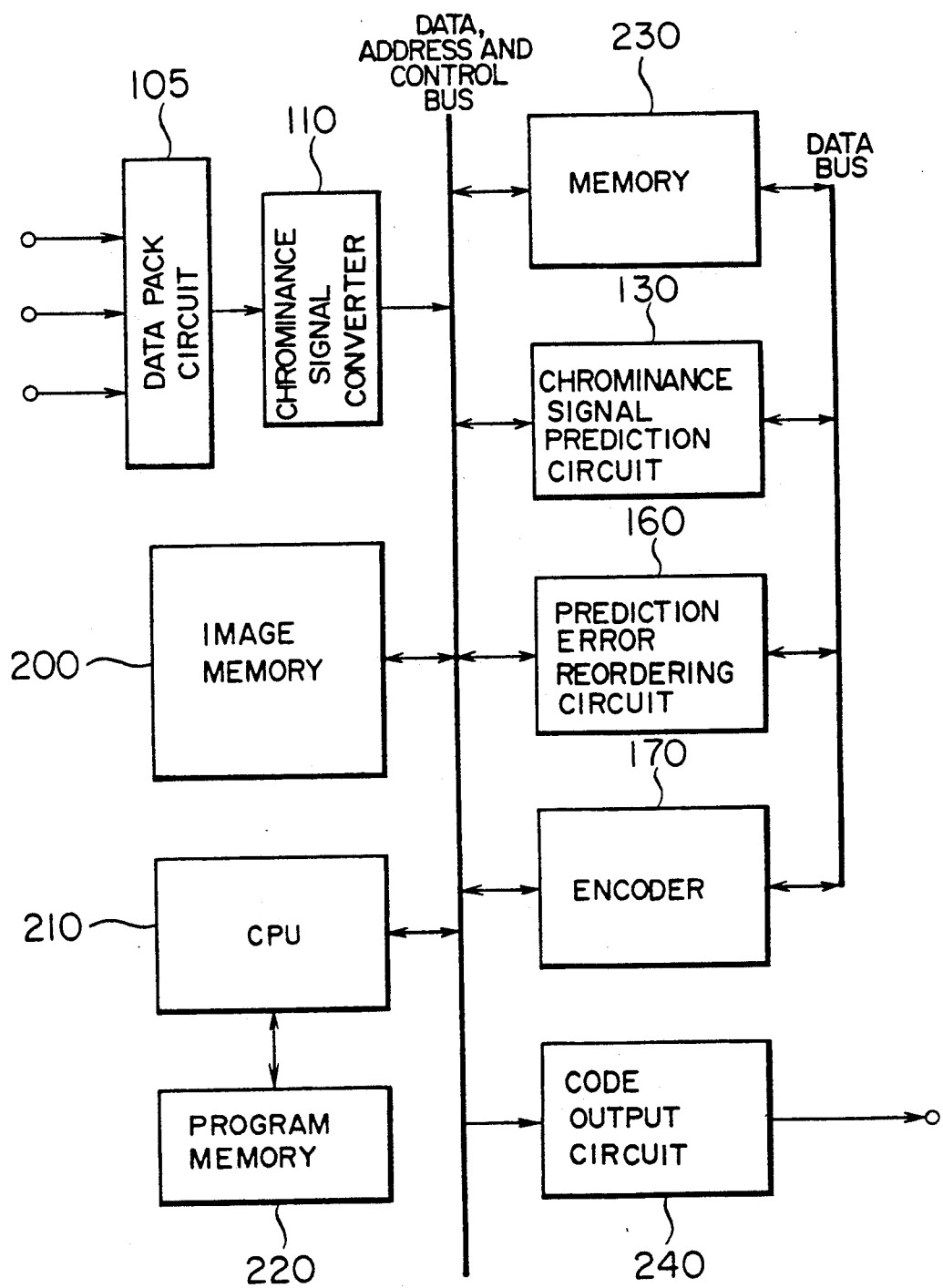
FIG. 11 is a detailed block diagram of the encoder.

FIG. 11 is a detailed block diagram of the encoder of the present embodiment wherein the respective blocks thereof are interconnected via a Data Bus, Address Bus, and Control Bus and wherein control thereof is effected by the CPU therein.

The input chrominance signals applied to a data pack circuit 105 are converted by the chrominance signal converter 110. The data pack circuit 105 functions to pack three colors/pixel image data into one word as shown in FIG. 12A. After the conversion by the chrominance signal converter 110, three-color data are packed into one word as shown in FIG. 12B so that a data transfer efficiency is improved.

The converted image data are stored in an image memory 200 which can be accessed by other units through a main bus.

Figure 13:
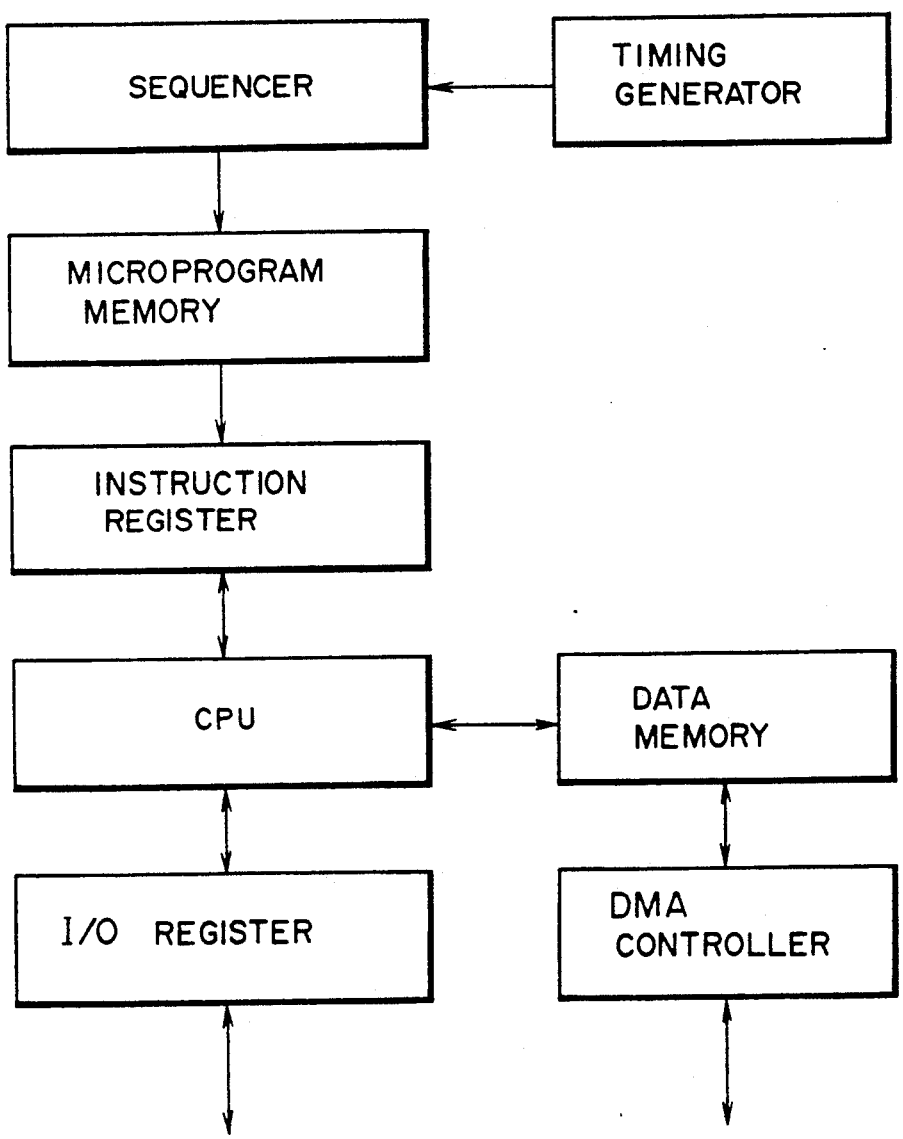
FIG. 13 is a block diagram of an encoder which uses a CPU for sequentially executing a microprogram.

The image data stored in the image memory 200 are encoded by using the chrominance signal prediction circuit 130, the prediction error reordering circuit 160 and the encoder 170. Those units perform the encoding in the procedure described for the embodiment and are controlled by a random logic circuit comprising a combination of gates. As shown in FIG. 13, it may be implemented by a CPU which sequentially executes a microprogram. In FIG. 11, those units are connected to a memory 230 through a data bus so that high speed encoding which is independent from the data transfer on the main bus is attained.

The data transfer between the image memory 200 and the encoder is performed at a high speed by the data pack function shown in FIG. 12B and a nibble mode or a static mode of a dynamic semiconductor memory.

The CPU 210 controls the overall system in accordance with the program stored in the program memory 220.

The encoded code words can be outputted through a code output circuit 240. The code words may be temporarily stored in the image memory 200 and then the code words may be processed.

In the data format shown in FIG. 12A, the data width for one color is 5-bit length, and the word width of the converted data in FIG. 12B is 16-bit length because one word in a conventional computer is of 16-bit length. Accordingly, in FIG. 12(B), an invalid data is stored at bit 15 in the chrominance signal conversion. The bit at bit 15 may be used as a flag for indicating the procedure in encoding.

Figure 14:
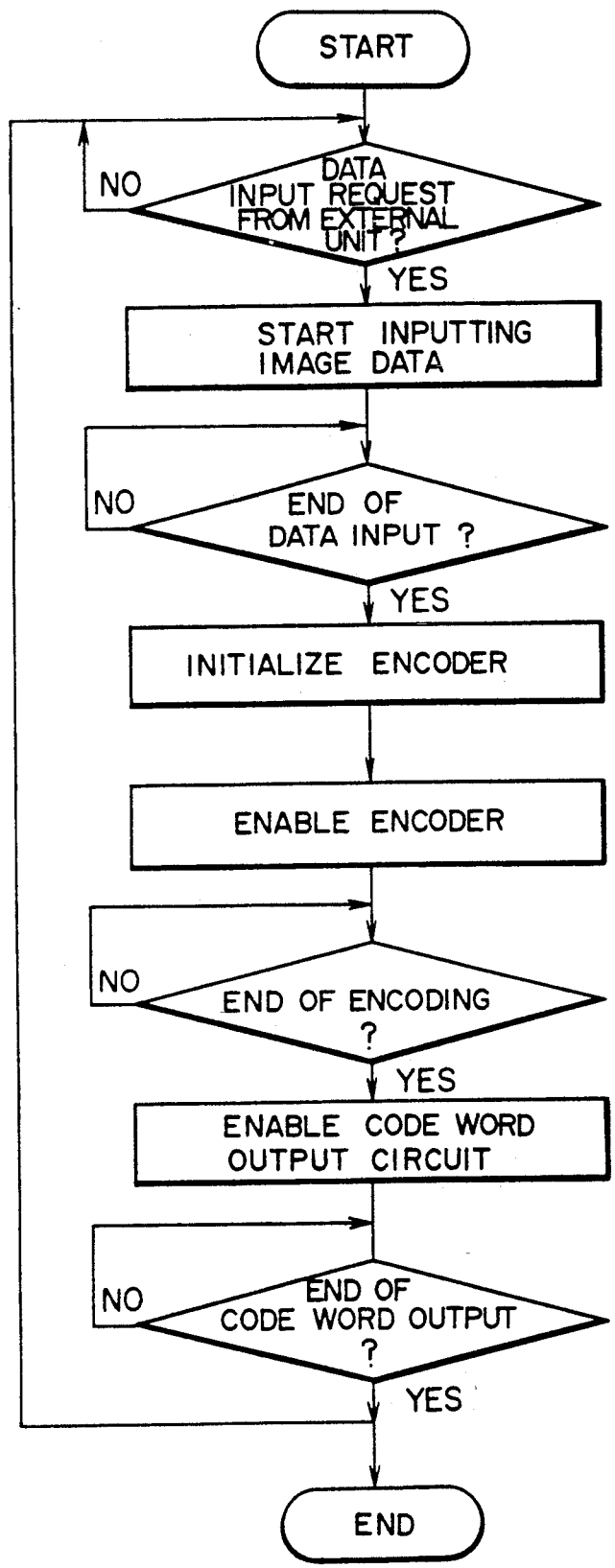
FIG. 14 is an operation flow chart of the CPU of FIG. 11.

FIG. 14 is a flow chart for illustrating an operation of the CPU 210. It shows a procedure from a waiting status for an image data from an external unit to an output status of the encoded image data. The CPU serves as a controller for the overall system and initializes the data input device, encoder and code word output device, commands start of operation and monitors end of operation and errors or malfunctions.

Figure 15:
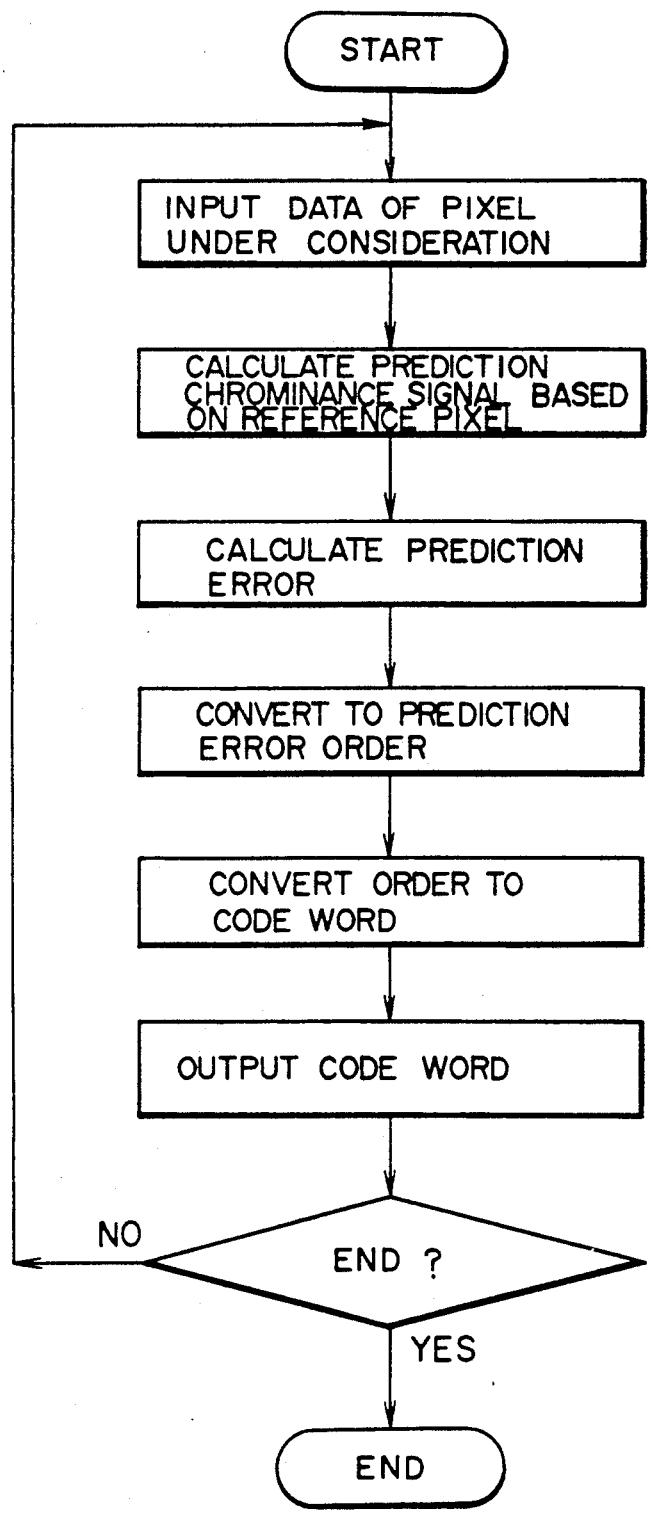
FIG. 15 is a flowchart illustrating an encoding process.

FIG. 15 is a flow chart for illustrating an encoding process. The operation in the flow chart may be carried out either by a single processor or by a plurality of processors in parallel mode to process at a high speed. It may also be carried out by a combinational gate circuit which carries out the operation of the flow chart.

With respect to designing an apparatus and/or method in accordance with that thus far described, a prediction equation (or a prediction table) in connection with the respective chrominance signals, which is for predicting new chrominance signals, respectively, relative to the last color signal, is prepared beforehand by statistically processing chrominance signals of various image data. When an actual chrominance signal is inputted, a predicted chrominance signal is generated in accordance with the prediction equation 5 (or by referring to the table) on the basis of the last chrominance signal. Of course, the predicted chrominance signal is also mathematically qualified in terms of a related prediction error associated therewith. It is disclosed in connection with the details regarding the FIG. 2 illustration and the related explanation associated therewith whereby chromatic information of a pixel under consideration can be predicted by chromatic information of a pixel adjacent to the pixel under consideration. This prediction is performed by utilizing the fact that the chromatic information of the pixel under consideration of the image is often one which is strongly connected with surrounding pixels. This applies to the case where the chromatic information of the pixel is represented by a coordinate system on a uniform color space. On such a uniform color space, color information pertaining to the pixel is represented by three quantities, i.e., hue $L^*$, value $C^*$, and chroma $H^*$ in accordance with equation 4. Accordingly, the prediction is to be performed in terms of these three chromatic quantities.

Equation 5 is provided in connection with effecting a prediction of the chrominance signals regarding the pixel under consideration. The prediction is performed by either an actual extempore operation or by referring to a table which is developed beforehand in accordance with an operation, as above discussed. However, any such prediction is naturally accompanied by a prediction error. Equation 6 represents the prediction error from the viewpoint of hue $L^*$, value $C^*$, and chroma $H^*$ such is clearly understood in connection with the illustrations in FIGS. 4 to 9A and the related discussion associated therewith. The prediction error which is associated with each of the predicted chrominance signals pertaining to the pixel in question can be represented by a small amount of information, i.e. using a short code word. Accordingly, it thus becomes possible to reduce the amount of information which is to be transmitted in connection with the transmission of the prediction errors. Based on such, it thus becomes possible to reduce the amount of required information to be transmitted during transmission of the prediction error for effecting a correction of the chromatic information on the receiver side based on the prediction errors. That is, the information which is transmitted or stored is a value of the prediction error. This is because a receiver or a reproducer can reproduce correct chromatic information of the pixel under consideration from the chromatic information of the adjacent pixels if the value of the prediction error is known. That is, correct information of the pixel under consideration, which is predicted in accordance with the knowledge of the adjacent pixels, is corrected by the value of the prediction error.

In order to reduce the quantity of signal information when the value of a prediction error is transmitted or stored, it is necessary to allocate a short code word to a value of the prediction error of which probability of occurrence is high, for example. The distribution of the probability of occurrence of the value of the prediction error is shown, for example, in FIG. 3. According to the present invention, in order to allocate a short code word to a value of the prediction error of which probability of occurrence is relatively high in accordance with the prediction signal, an occurrence ordering table containing values of the prediction errors is provided for each prediction effected and a relevant table is selected by means of a prediction chrominance signal so as to examine the prediction error of which occurrence order on the table the actual prediction error is relevant to thereby for encoding the occurrence order of the relevant prediction error. It is therefore natural that a short code word can be allocated to an order of a high probability of occurrence (see Table 1 above). The predicted chrominance signals, of course, thus becomes corrected in accordance with the prediction error values transmitted from the transmitter to the receiver side so as to obtain a correct chrominance signal.

We claim:

1. A method of encoding three chrominance signals representative of a color of each pixel constituting a color image, said method comprising the steps of:
   (a) converting values of three input chrominance signals to three corresponding other values of different types of chrominance signals, said other values representing a position on a uniform color space;
   (b) temporarily storing said corresponding other values;
   (c) determining a value of each of the three converted chrominance signals on the uniform color space to be next encoded of a pixel under consideration by utilizing as a reference signal a stored converted value of each of the chrominance signals, on the uniform color space, which corresponds to adjacent pixels of the pixel under consideration so as to provide estimation chrominance signals with respect to the pixel under consideration;
   (d) calculating, with respect to each pixel under consideration, the difference between said estimation chrominance signals obtained according to step (c) and said converted chrominance signals taken from actual converted chrominance signals temporarily stored, to be encoded and which correspond to signals on the uniform color space, to produce a prediction error signal;
   (e) determining values indicative of an order of occurrence of said estimation chrominance signals, using positions on said uniform color space, based on the possibilities of occurrence of errors specific to each of said estimation chrominance signals produced;
   (f) rearranging the order of occurrences of the calculated prediction error signals to an order corresponding to the order determined according to step (e), and
   (g) encoding the rearranged order of occurrences of the calculated prediction error signals for transmission therefor.

2. An apparatus for encoding chrominance signals representative of a color of each pixel constituting a color image comprising:
   means for converting the values of three input chrominance signals to three corresponding other values of different types of chrominance signals, said other values representing a position on a uniform color space;
   second means for storing said corresponding other values;
   third means for providing an estimation chrominance signal to be next encoded and transmitted, with respect to a pixel under consideration, in response to each of said converted chrominance signals stored by said second means which correspond to adjacent pixels;
   fourth means, coupled to said second and third means, for calculating the difference, resulting in a prediction error signal with respect to each pixel under consideration, between respective estimation chrominance signals produced by said third means and corresponding converted chrominance signals taken from actual converted chrominance signals stored in said second means;
   fifth means, coupled to said third means, for determining values indicative of an order of occurrence of said estimation chrominance signals, using positions on said uniform color space, based on the probabilities of occurrence of errors specific to each of said estimation chrominance signals produced;
   sixth means, coupled to said fourth and fifth means, for rearranging the order of occurrence of said prediction error signals received from said fourth means to an order based on the values indicative of the order of occurrence of said estimation chrominance signals as determined by said fifth means; and
   seventh means, coupled to said sixth means, for encoding the rearranged order of occurrences of the calculated prediction error signals, arranged according to said sixth means, for transmission therefor.

3. An apparatus according to claim 2, wherein said second means includes:
   a buffer memory.

4. An apparatus according to claim 2, wherein said third means includes:
   averaging circuits of chrominance signal values for each one of said three chrominance signals based on stored pixel information of adjacent pixels to said pixel to be next encoded.

* * * * *